United States Patent
Ikoma et al.

(10) Patent No.: US 6,836,892 B2
(45) Date of Patent: Dec. 28, 2004

(54) APPARATUS AND METHOD FOR USE IN DISTRIBUTED COMPUTING ENVIRONMENT FOR CONVERTING DATA FORMAT BETWEEN PROGRAM LANGUAGE-SPECIFIC FORMAT USED IN RESPECTIVE COMPUTERS AND STREAM FORMAT USED FOR COMMUNICATION AMONG COMPUTERS

(75) Inventors: Mikio Ikoma, Kamakura (JP); Youji Fujihara, Fujisawa (JP); Takahiro Tanida, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/603,694

(22) Filed: Jun. 26, 2003

(65) Prior Publication Data

US 2004/0031037 A1 Feb. 12, 2004

Related U.S. Application Data

(63) Continuation of application No. 09/299,644, filed on Apr. 27, 1999, now abandoned.

(30) Foreign Application Priority Data

Apr. 28, 1998 (JP) .......................................... 10-118121

(51) Int. Cl.[7] .............................. G06F 3/00; G06F 9/44; G06F 9/46; G06F 13/00

(52) U.S. Cl. ....................... 719/313; 719/310; 719/330; 709/246; 711/118

(58) Field of Search ................................ 719/313, 330, 719/310; 709/246; 711/118–146

(56) References Cited

U.S. PATENT DOCUMENTS

| | | | |
|---|---|---|---|
| 5,557,798 | A | 9/1996 | Skeen et al. |
| 5,640,564 | A | 6/1997 | Hamilton et al. |
| 5,793,970 | A | 8/1998 | Fakes et al. |
| 5,860,072 | A | 1/1999 | Schofield |

*Primary Examiner*—Meng-Al T. An
*Assistant Examiner*—Diem Cao
(74) *Attorney, Agent, or Firm*—Antonelli, Terry, Stout & Kraus, LLP

(57) ABSTRACT

In an object request broker (ORB) for processing requests or responses among distributed objects, a method and an apparatus for realizing a high processing speed of a process to convert from data (communication data) which is used in communication among the ORBs and is not specific to particular computers into a data format (program data) which is specific to a program language. A correspondence between the communication data which was transmitted and received by the ORB and the conversion into the program data corresponding thereto is stored in a cache which can be called at a high speed. When a receiving process of the same communication data cached at the second and subsequent times or a transmitting process of the program data occurs, the cached conversion result is used.

18 Claims, 7 Drawing Sheets

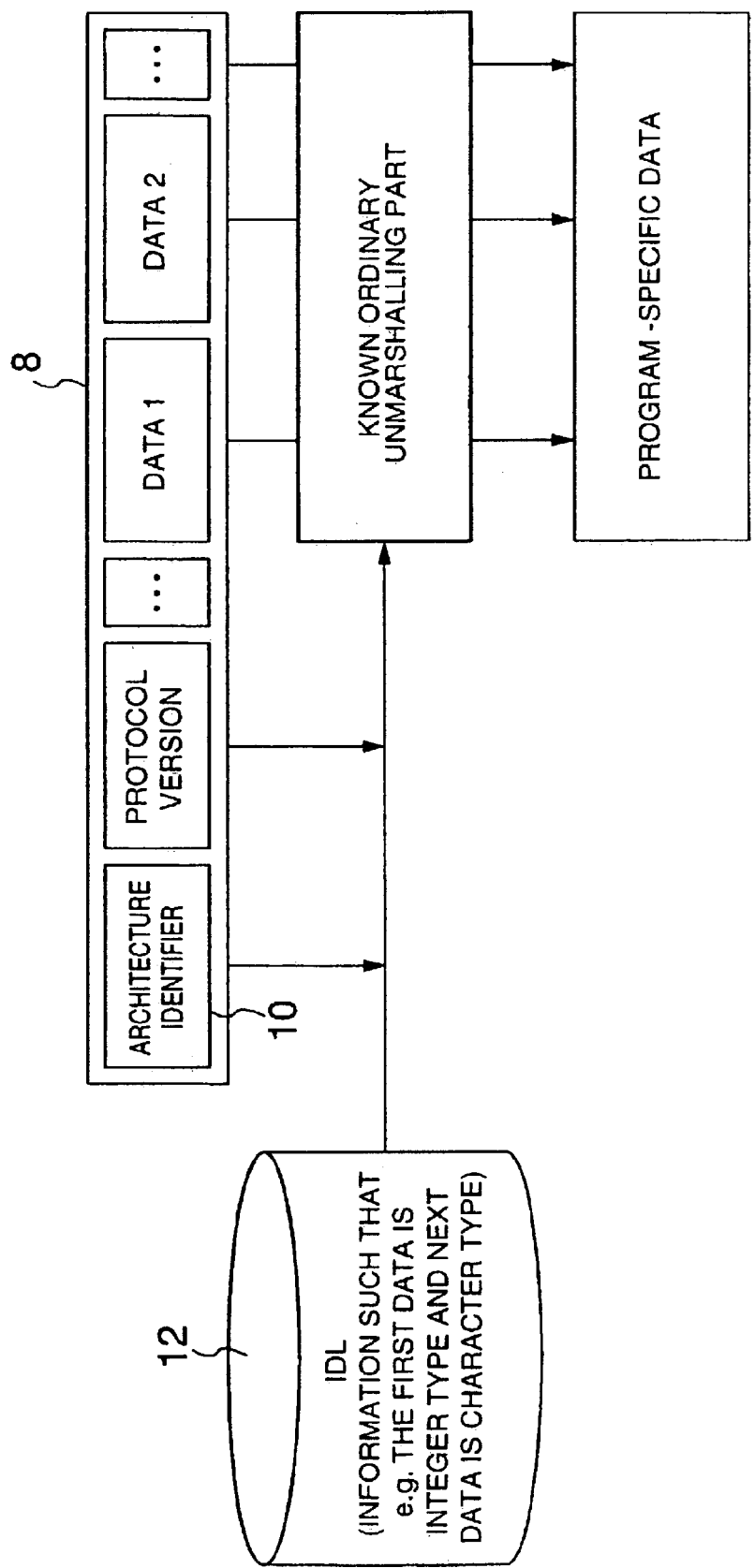

APPARATUS AND METHOD FOR USE IN DISTRIBUTED COMPUTING ENVIRONMENT FOR CONVERTING DATA FORMAT BETWEEN PROGRAM LANGUAGE-SPECIFIC FORMAT USED IN RESPECTIVE COMPUTERS AND STREAM FORMAT USED FOR COMMUNICATION AMONG COMPUTERS

This is a continuation of prior application Ser. No. 09/299,644, filed Apr. 27, 1999, now abandoned.

BACKGROUND OF THE INVENTION

The invention relates to method and apparatus for converting a computer-dependent data format (that is, computer-specific data format) when data is communicated among a plurality of computers. More particularly, the invention relates to a method of converting a program language-dependent data format (that is, program language-specific data format) which is used for communication among distributed objects on a plurality of computers for performing a distributed computing and is used in each computer into a stream data format which is used for communication among the computers. The invention also relates to method and apparatus for converting a stream data format which is used in communication among the computers into a program language-specific data format which is used in each computer.

Generally, when calling from a certain program to another program, a transmission and a reception of data are performed on the same computer by using an interface which depends on a specific operating system and a specific program language. On the other hand, in a distributed computing environment, a plurality of programs (distributed objects) can exist over a plurality of computers and can transmit and receive data. A distributed object which requests a process is called a client object. A distributed object which processes the request from the client object is called a server object. A function for accepting the request from the client object, retrieving a proper server object to process the request, communicating with the computer in which the server object exists, and calling the server object is called an object request broker (ORB). In the case where the client object and the server object communicate among a plurality of computers, the ORB performs a data exchange by using data of a neutral stream format which is not specific to the architecture of a particular computer, a particular operating system, and a particular program language. Therefore, in order to incorporate an ORB, it is necessary to provide a process (marshalling) for converting from a format which is specific to the architecture of particular computer, particular operating system, and particular program language into a neutral data stream and a reverse process (unmarshalling).

SUMMARY OF THE INVENTION

Generally, the server object residentially or persistently exists on a certain computer and processes requests from many and unspecified client objects a plural number of times. Each time the request from the client object comes, the unmarshalling process occurs. Each time a reply to the request is returned, the marshalling process occurs.

An example of the unmarshalling process and marshalling process will be described with reference to FIG. 7.

In FIG. 7, in the unmarshalling process, stream data is divided from an identifier 10 describing a marshalling method written in the head of stream data 8 and an IDL (Interface Definition Language) 12 describing a structure of the stream data and is converted into the data which is specific to a particular program language while discriminating attributes of each of the divided data elements from the IDL. The IDL 12 includes, for example, information indicating such that the first data of the stream data is an integer type and the next data is a character type. In the marshalling process, first, a marshalling method is determined from the architecture of the computer which executes the marshalling process and the version of the ORB and the identifier 10 of the marshalling method is stored in the header of the stream. Subsequently, the attributes of the data are discriminated with respect to each of the program language-specific data and the program language-specific data is converted into the stream data. In those processes, it is necessary to understand the meaning of each of the inputted data in order to convert each inputted data. In the case where data of a complicated format such as data of a user definition type or the like is exchanged between the client and the server, a load of computing resources (CPU, main memory or other resources) which are required for the marshalling and unmarshalling is large.

It is an object of the invention to provide high-speed marshalling and unmarshalling processing methods and apparatus in the case where a transmission and a reception of data between a client and a server occur a plural number of times.

To accomplish the above object, according to one aspect of the invention, there is provided an apparatus for converting a data format which is specific to a particular program language on a particular computer into stream data which is not specific to, i.e., is common to particular computers, comprising: a caching part or component for storing a correspondence between a program language-specific data format and stream data; a marshalling part or component for retrieving whether all or a part of the data of the program language-specific format has been stored in the cache or not, for performing a conversion by using the data on the cache when the data exists on the cache, and for converting the data of the program language-specific format into the stream data without using the cache when the data does not exist on the cache; and a cache registering part or component for registering a result into the cache at the time of the conversion from the data of the program language-specific format into the stream data or the conversion from the stream data into the data of the program language-specific format.

In such a construction, when the data is transmitted, the marshalling part retrieves or discriminates whether the received data exists on the cache or not, converts the data at a high speed by referring to the cache when the data exists, and converts the data at a low speed by the foregoing method or another known method without using the cache when the data does not exist. When the data is converted by the method which does not use the cache, the conversion result is registered into the cache by using the cache registering part.

According to another aspect of the invention, there is provided an apparatus for converting stream data which is not specific to or is common to particular computers into the data of a format which is specific to a particular program language on a particular computer, comprising: a caching part or component for storing a correspondence between stream data and data of a program language-specific format; an unmarshalling part or component for discriminating whether all or a part of the stream data has been stored in the cache or not, for performing a conversion by using the data on the cache when the stream data exists on the cache, and for converting the stream data into the data of the program language-specific format without using the cache when the data does not exist on the cache; and a cache registering part or component for registering a result into the cache at the time of the conversion from the stream data into the data of the program language-specific format or the conversion from the data of the program language-specific format into the stream data. In such a construction, when the data is received, the unmarshalling part discriminates whether the received data exists on the cache or not, converts the data at a high speed by using the cache when the data exists, and converts the data at a low speed by the foregoing method or another known method without using the cache when the data does not exist on the cache. When the data is converted without using the cache, the conversion result is registered into the cache by using the cache registering part.

BRIEF DESCRIPTION OF THE DRAWINGS

FIG. 7 is a diagram that is useful for explaining an example of a marshalling process which does not use a cache and an unmarshalling process.

DETAILED DESCRIPTION OF THE EMBODIMENTS

Figure 1:
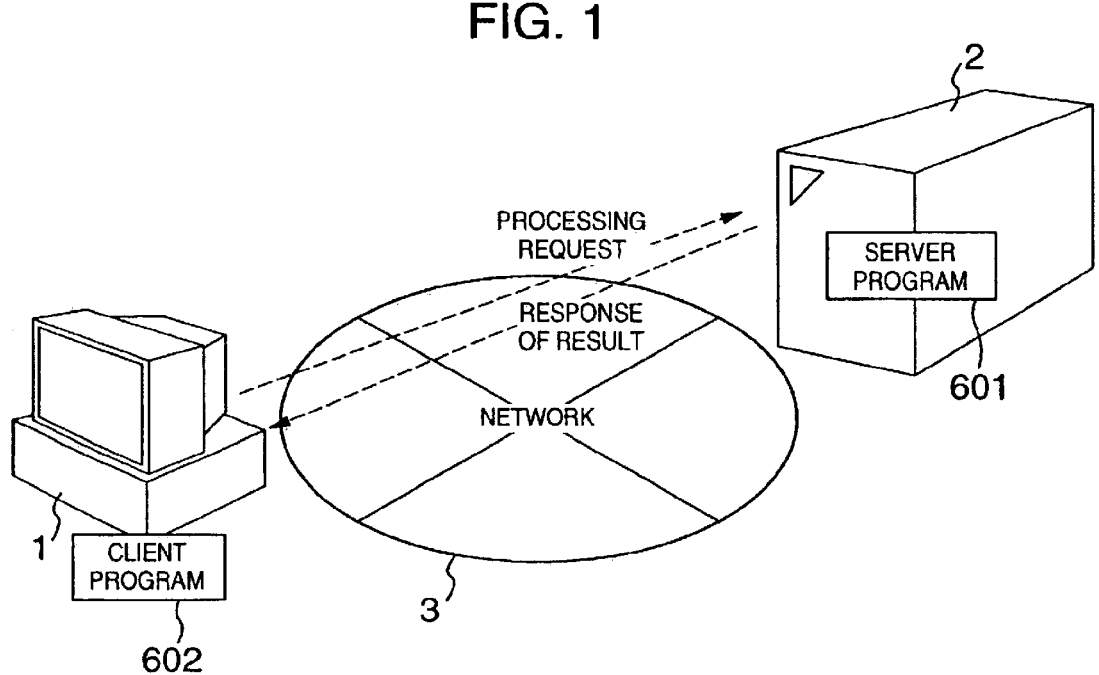
FIG. 1 is a diagram showing a constructional example of a distributed computing environment to which the invention is applied.

An embodiment of the invention will now be described hereinbelow with reference to the drawings. Similar component elements in the diagrams are designated by the same reference numerals.

FIG. 1 is a diagram showing a construction of a distributed computing environment according to an embodiment of the invention.

Figure 2:
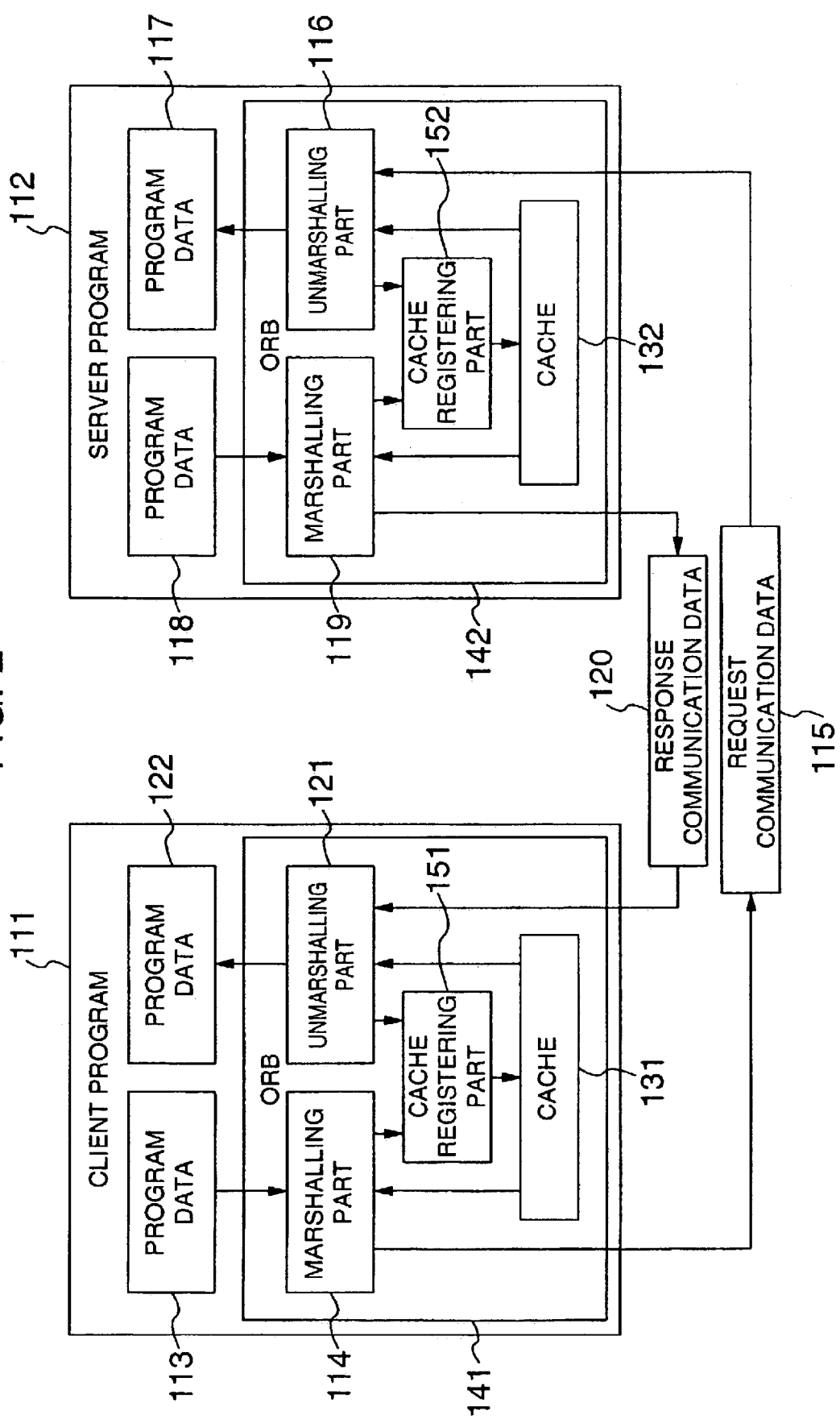
FIG. 2 is a diagram showing an ORB (object request broker) according to an embodiment of the invention.

In the diagram, a client program 602 on a small computer 1 requests a processing work to a server program 601 on a large computer 2 existing at a remote place and having a plenty of computing resources via a network 3. By receiving this request, the server program 601 processes the processing job or task and returns a result of the processing to the client program 602. FIG. 2 is a diagram showing a flow of data in such a construction.

In FIG. 2, a client program 111 has therein: program data 113 and 122 which is specific to a computer and a described program language; an ORB 141 which is used by the client program; and the like. The OBR 141 includes a marshalling part 114, a unmarshalling part 121, cache registering part 151 and a cache part 131. A server program 112 has therein: program data 117 and 118 which is specific to the computer and the described program language; and ORB 142 which is used by the server program; and the like. The OBR 142 includes a marshalling part 119, a unmarshalling part 116, cache registering part 152 and a cache part 132.

How to exchange the data between the client program 111 and server program 112 in FIG. 2 will now be described with respect to a flow of data. In the client program 11, to transmit the program data 113 of a data format specific to the computer on which the client program operates and the described program to the server program 112, a marshalling part 114 of the ORB 141 converts the program data 113 requesting communication data 115 which is not specific to particular computers or program languages and the cache registering part 151 registers the result of the conversion into the cache 131. In this instance, if all or a part of the program data 113 exists in a cache 131 of the client program by referring to the cache 131, the data is converted into the request communication data 115 by using the cache data. After completion of the conversion, the data 115 is transmitted to the server program 112.

In the server program 112, an unmarshalling part 116 of the ORB 142 converts the received request communication data 115 into the program data 117 of a format which is specific to the computer on which the server program operates or to the described program language and the cache registering part 152 registers the result of the conversion into the cache 132. In this instance, if all or a part of the request communication data 115 exists in a cache 132 of the server program by referring to the cache 132, the data is converted into the program data 117 by using the cache data.

After the server program processed the request from the client, to return the program data 118 as a processing result to the client program, the data is converted into response communication data 120 by a marshalling part 119 of the ORB 142 and the cache registering part 152 registers the result of the conversion into the cache 132. At this time, if all or a part of the program data 118 exists in the cache 132 of the server program with reference to the cache 132, the data is converted into the response communication data 120 by using the cache data. The response communication data 120 is transmitted to the client program.

In the client program 111, the received data is converted into the program data 122 of the client program language-specific format by an unmarshalling part 121 of the ORB 141 and the cache registering part 151 registers the result of the conversion into the cache 131. At this time, if all or a part of the response communication data 120 exists in a cache 131, the data is converted into the program data 122 by using the cache data. In this manner, the data transmission and reception can be performed between the distributed client and server programs at a high speed.

An embodiment of processes in the marshalling part 114 and 119 in FIG. 2 will now be described with reference to FIG. 3. Although the marshalling part 114 in FIG. 2 is used as an example in the description, a similar embodiment is also possible in the marshalling part 119.

Figure 3:
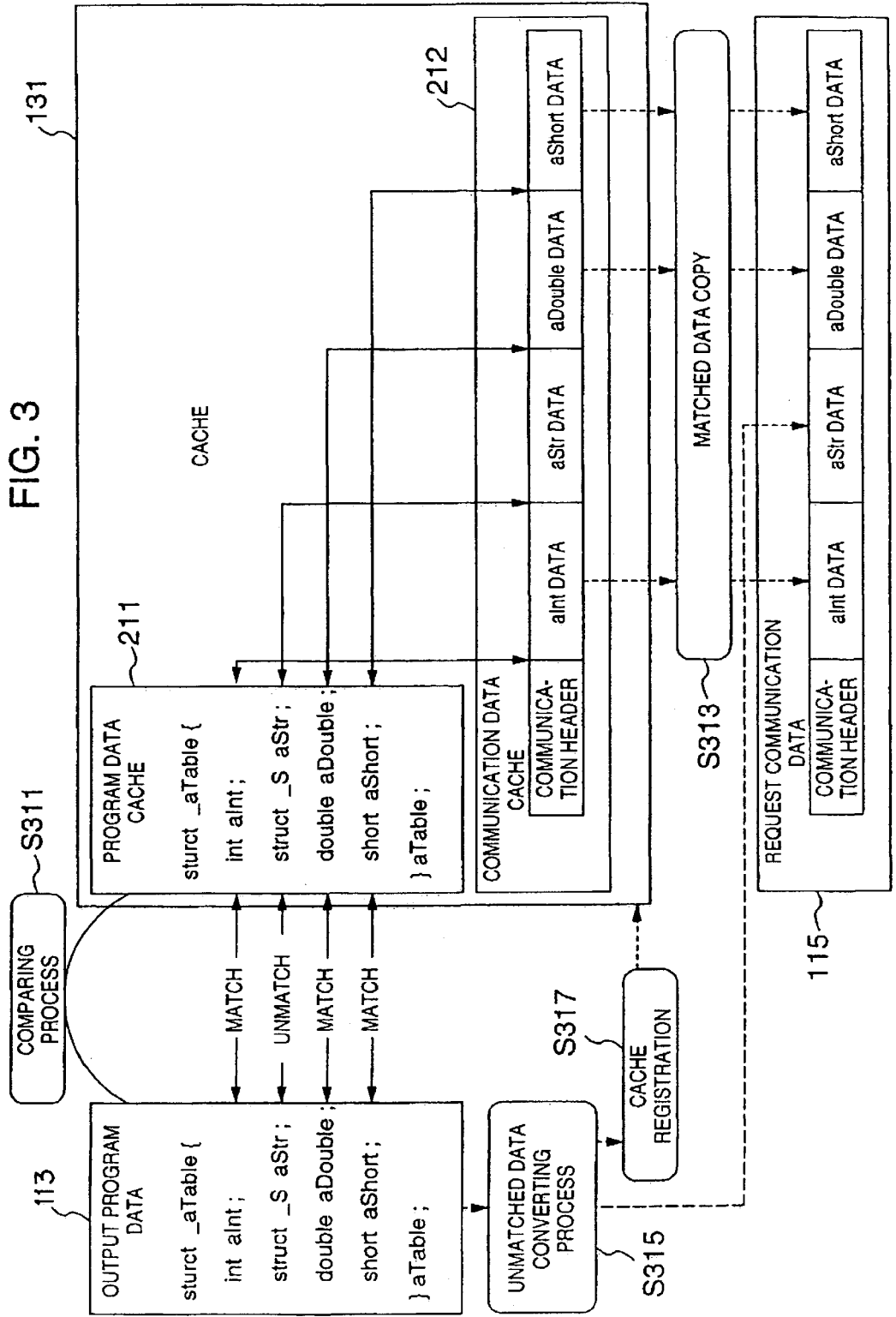
FIG. 3 is a diagram showing a flow of data at the time of marshalling and a structure of a cache in the embodiment of FIG. 2.

FIG. 3 is a diagram showing a structure of the cache at the time of marshalling and a flow of data of the marshalling process. First, the structure of the cache will be explained. A pair of contents of the program data and contents of the communication data corresponding thereto have been stored in the cache every type of program data (in the example of FIG. 3, a pair of a program data cache 211 and a communication data cache 212 for an "aTable" struct). When the program data is based on the user definition type, every element (user definition type or basic type) of the user definition type data, an offset from the header of the communication data corresponding thereto is stored in the cache. In the example of FIG. 3, a system having the cache corresponding to every user definition type and basic type is shown. Although the case where the correspondence of the pair of communication data and program data is stored on the cache is shown in the diagram, a correspondence of a plurality of pairs of communication data and program data can be also provided on the cache. The "basic type" indicates data such as numeral, a single character, a character string, or the like. The "user definition type" indicates a set of basic type data and other user definition type data, which is generally complicated data. For example, a plurality of attributes of a particular employee such as name, age and employee identification number, can be represented by single user definition type data.

A flow of data of the marshalling process and a flow of control will now be described with reference to FIGS. 3 and 4. In the marshalling part, first, the program data 113 to be transmitted and the program data 211 on the cache corresponding to its type are compared (S311) and whether their contents are matched with each other or not is discriminated (S312). Even in the case where the data to be checked is the user definition type such as struct, union, or the like, it is not decomposed to respective elemental types constituting the user definition type, but the user definition type is compared, as is, on the memory. If it is determined that the contents match as a comparison result, the next data is checked. When there is a difference or unmatch between the contents, the communication data 212 on the cache corresponding to the program data which was identical or matched until the difference is detected is copied into the request communication data 115 (S313). Whether the program data with the difference or unmatch is the basic type or the user definition type is discriminated (S314). In case of the basic type, since it does not take a long time for the converting process, a process to convert the program data into the communication data is performed (S315). In case of the user definition type, the data is long in many cases and there is a possibility that the user definition type data has been registered in another cache. Therefore, the marshalling process is recursively called (S316). (In the example of FIG. 3, the marshalling process is recursively called by using the struct "aStr" in which the output program data 113 does not coincide or match as an argument.) A conversion result in step S315 or S316 is registered into the cache (S317). The processes in steps S311 to S317 are executed to all of the data. When there is no data to be processed (S310), the communication data remaining on the cache at this time point is copied (S318).

An embodiment of the processes in the unmarshalling parts 116 and 121 in FIG. 2 will now be described. Although the unmarshalling part 116 in FIG. 2 will be explained as an example, a similar embodiment is also possible even in the unmarshalling part 121.

Figure 5:
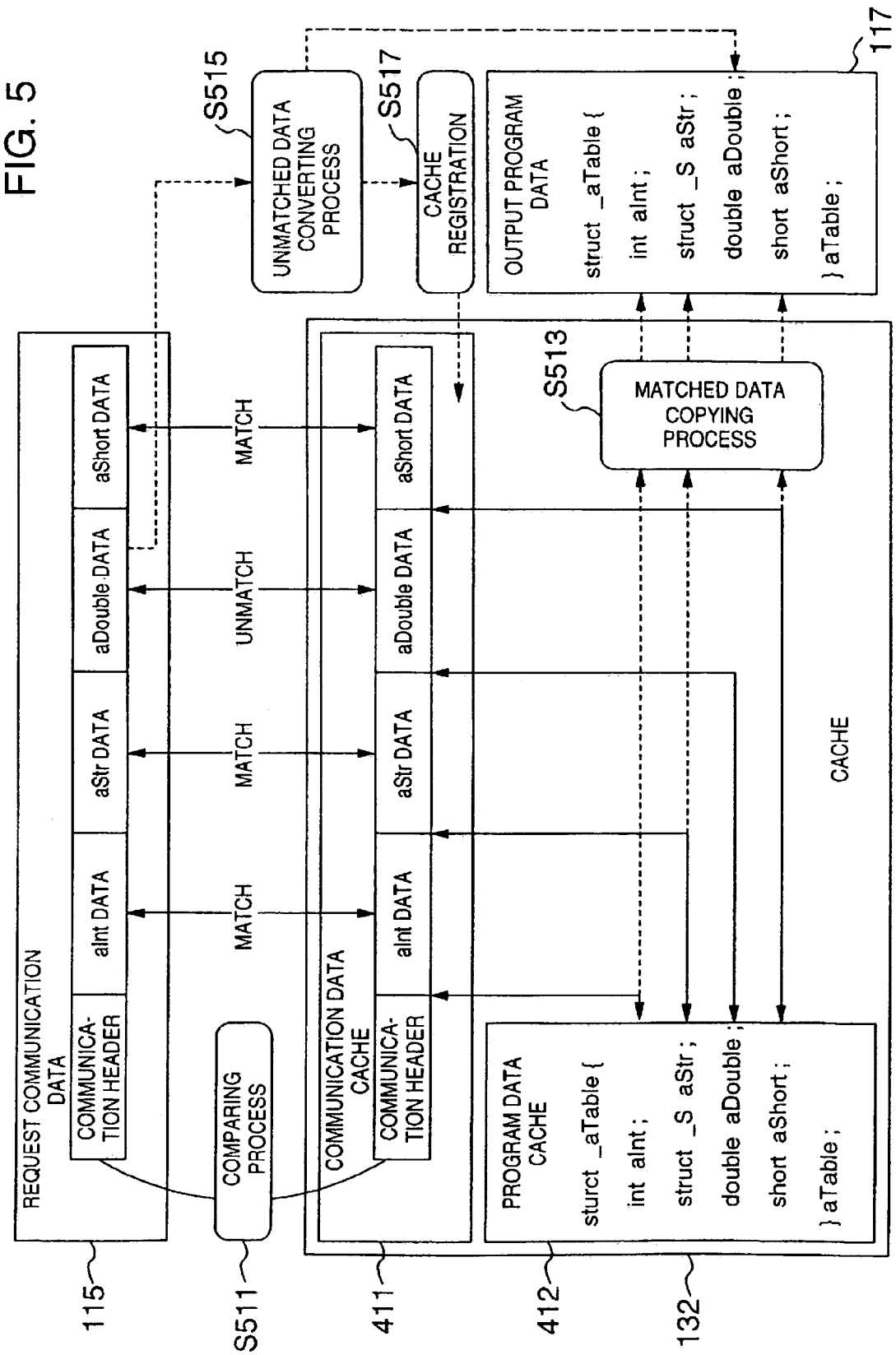
FIG. 5 is a diagram showing a flow of data at the time of unmarshalling and a structure of a cache in the embodiment of FIG. 2.

FIG. 5 is a diagram showing a structure of the cache at the time of unmarshalling and a flow of data in the unmarshalling process. First, the structure of the cache will be explained. A pair of contents of the program data and contents of the communication data corresponding thereto have been stored in the cache every type of program data (in the example of FIG. 5, a pair of a communication data cache 411 for an "aTable" struct and a program data cache 412). When the program data is the user definition type, every element (user definition type or basic type) of the program data of the user definition type, an offset from the header of the communication data corresponding thereto is stored in the cache. By using this correlation, to which element in the program data an arbitrary offset of the communication data corresponds will be understood. In the example of FIG. 5, a system having the cache every user definition type and basic type is shown. Although the case where the correspondence of the pair of communication data and program data has been stored on the cache every type is shown in the diagram, a correspondence of a plurality of pairs of communication data and program data can be also provided on the cache.

A flow of data in the unmarshalling process and a flow of control will now be described with reference to FIGS. 5 and 6. In the unmarshalling part, the received request communication data 115 and the communication data 411 on the cache are compared on an octet unit basis as a unit of the communication data (S511). Whether they have the same value or not is discriminated (S512). Thus, if they have the same value, the next octet is checked. If they do not have the same value and there is a difference or unmatch, the program data 412 on the cache corresponding to the communication data which was identical or showed match until the difference or unmatch is detected is copied into the output program data 117 (S513). Whether the program data having the difference or unmatch is the basic type or user definition type is discriminated by looking at the program data or IDL 12 (S514). In case of the basic type, since it does not take a long time for the converting process, a process to convert the communication data into the program data is performed (S515). In case of the user definition type, the data is long in many cases and there is a possibility that the data of the user definition type has been registered in another cache (not shown). Therefore, the unmarshalling process is recursively called (S516). A conversion result in step S515 or S516 is registered into the cache (S517). The processes in steps S511 to S517 are executed to all of the octets of the communication data. When there is no data to be processed (S510), the program data remaining on the cache at this time point is copied (S518).

Generally, the server object residentially or persistently exists on a certain computer and processes similar requests from many and unspecified client objects a plural number of times. Hitherto, to independently execute the marshalling and unmarshalling processes in response to those similar processing requests of a plural number of times, in the case where a complicated data format is exchanged between the client and the server, a load of computing resources (CPU, main memory) which are required for the marshalling and unmarshalling is large. In the embodiment, the converting process which was once performed is stored into the cache and it is used from the next time, so that the computing resources which are required for the marshalling and unmarshalling can be reduced.

Figure 4:
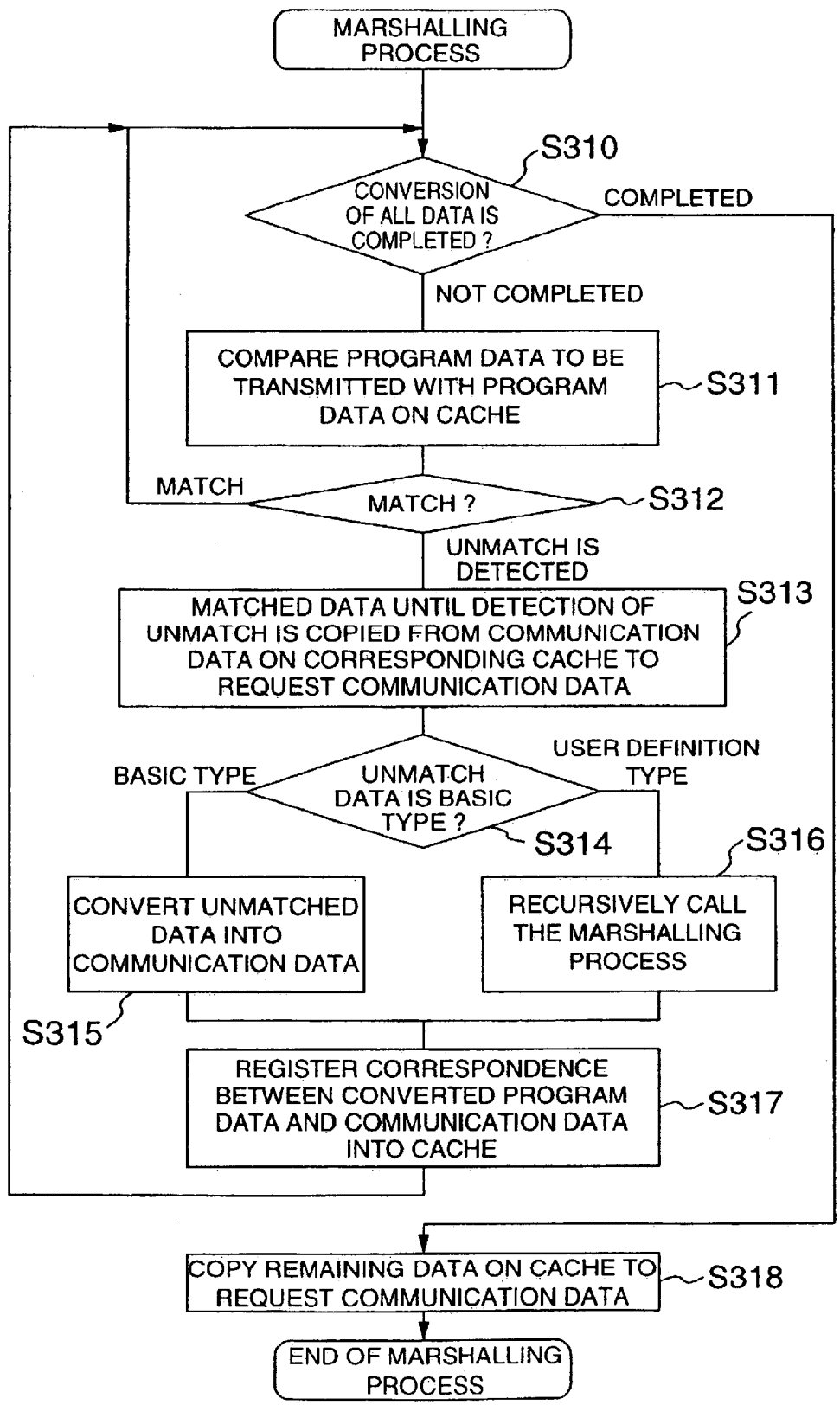
FIG. 4 is a flowchart showing a flow of processes at the time of marshalling in the embodiment of FIG. 2.
Figure 6:
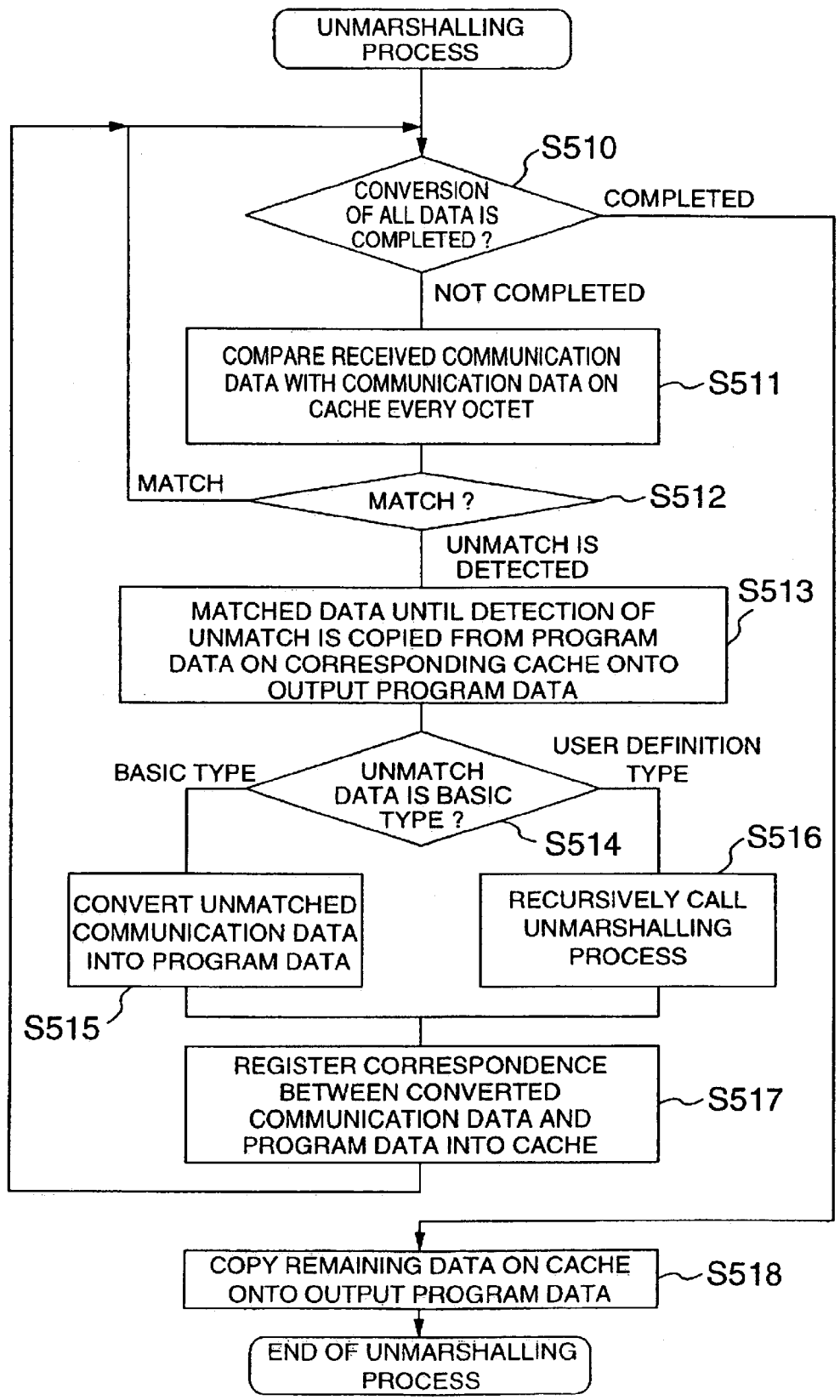
FIG. 6 is a flowchart showing a flow of processes at the time of unmarshalling in the embodiment of FIG. 2.

The procedures shown in FIGS. 4 and 6 and other procedures described herein can be stored into an ROM or a disk in each of the small computer 1 and large computer 2 or into another memory means.

What is claimed is:

1. An apparatus for converting data of a first data format used on a particular computer into data of a second data format which is common to a plurality of computers in a distributed computing environment, comprising:

a caching part for storing data of the first data format and corresponding data of the second data format and correspondence between the data of the first data format and the corresponding data of the second data format;

a marshalling part for discriminating whether at least a part of the data of the first data format to be converted has been stored in said caching part or not, for converting said data of the first data format to be converted into the data of the second format by using the correspondence stored in said caching part such that; for a part or whole of said data of the first format to be converted that matches the data of the first format stored in said caching part, conversion is made by using the correspondence and that; for another part of said data of the first format to be converted that does not match the data of the first format stored in said caching part, conversion is made with or without using said caching part depending upon a data type of said unmatched part of the data of the first data format; and a cache registering part for registering said converted data into said caching part.

2. An apparatus according to claim 1, wherein said first data format is a data format specific to a particular program language and said second data format is a stream data format.

3. An apparatus for converting data of a second data format which is common to a plurality of computers into data of a first data format used on a particular computer in a distributed computing environment, comprising:

a caching part for storing data of the second format and corresponding data of the first format and correspondence between the data of the second format and the corresponding data of the first format;

an unmarshalling part for discriminating whether at feast a part of the data of the second data format to be converted has been stored in said caching part or not, for converting said data of the second data format to be converted into the data of the first data format by using the correspondence stored in said caching part such that; for a part or whole of said data of the second format to be converted that matches the data of the second format stored in said caching part, conversion is made by using the correspondence and that; for another part of said data of the second format to be converted that does not match the data of the second format stored in said caching part, conversion is made with or without using said caching part depending upon a data type of said unmatched part of the data of the second data format; and a cache registering part for registering said converted data of the first data format into said caching part.

4. An apparatus according to claim 3, wherein said first data format is a data format specific to a particular program language and said second data format is a stream data format.

5. A method of converting client program data of a client program into request communication data common to a plurality of program languages or computers in order to request a processing task from said client program to a server program on a server in a distributed computing environment, comprising the steps of:

discriminating whether at least a part of said client program data exists in a cache of said client program or not by referring to said cache, said cache storing client program data and corresponding request communication data and correspondence between the client program data and the request communication data;

converting said client program data into said request communication data by using the correspondence stored in said cache such that; for a part or whole of the client program data to be converted that matches the client program data stored in said cache, conversion is made by using the correspondence and that; for another part of said data of the client program data to be converted that does not match the client program data stored in said cache, conversion is made with or without using said cache depending upon a data type of said unmatched part of the data of the client program data;

storing the request communication data into said cache as a conversion result when said data does not exist; and transmitting said converted requesting communication data to said server program.

6. A method according to claim 5, wherein said client program data is specific to a particular program language describing said client program and said common communication data is stream data.

7. A method according to claim 3, wherein said method is stored on a computer-readable medium as a computer readable program.

8. A method of converting request communication data which is transmitted from a client and is common to a plurality of program languages or computers into program data of a program language describing a server program which operates on a server in a distributed computing environment and processing a processing task requested by the client, comprising the steps of:

receiving said request communication data by an unmarshalling part in said server;

discriminating whether at least a part of said request communication data exists in a cache of said server program or not by referring to said cache, said cache storing the request communication data and corresponding program data and correspondence between the request communication data and the program data;

converting said received requesting communication data into the program data of the program language describing said server program by using the correspondence stored in said cache such that; for a part or whole of the request communication data to be converted that matches the request communication data stored in said cache, conversion is made by using the correspondence and that; for another part of said data of the request communication data to be converted that does not match the request communication data stored in-said cache, conversion is made with or without using said cache depending upon a data type of said unmatched part of the data of the request communication data;

storing the program data into said cache as a conversion result when said data does not exist; and processing the processing task requested by said client on the basis of said converted program data.

9. A method according to claim 8, wherein said step of processing the processing task requested by said client on the basis of said converted program data further comprising the steps of:

processing the processing task requested by said client on the basis of said converted program data and forming the resultant program data;

discriminating whether at least a part of said resultant program data exists in said cache or not by referring to the cache in said server program;

converting said resultant program data by using the program data on said cache into response communication data which is common to the plurality of computers or program language when said data exists, while converting said data by determining attributes of said resultant program data when said data does not exist;

storing the response communication data into said cache as a conversion result when said data does not exist; and transmitting said converted response communication data to said client program.

10. A method according to claim 8, wherein said program data of a program lanugage describing a server program is specific to a particular program language describing a server program.

11. A method according to claim 4, wherein said method is stored on a computer-readable medium as a computer readable program.

12. A method whereby a client program receives and processes response communication data which is transmitted from a server and is common to a plurality of computers or program languages in a distributed computing environment, comprising the steps of:

receiving said response communication data by said client program;

discriminating whether at least a part of said response communication data exists in a cache of said client program or not by referring to said cache, said cache storing response communication data and corresponding client program data and correspondence between the response communication data and the client program data;

converting said received response communication data into client program data by using the correspondence stored in said cache such that; for a part or whole of the response communication data to be converted that matches the response communication data stored in said cache, conversion is made by using the correspondence and that; for another part of said data of the response communication data to be converted that does not match the response communication data stored in said cache, conversion is made with or without using said cache depending upon a data type of said unmatched part of the data of the response communication data; and storing the client program data into said cache as a conversion result when said data does not exist.

13. A computer software product including a computer-readable medium having a computer readable program embodied in the medium for making program data to be transmitted subject to a marshalling process to generate request communication data, said medium having stored thereon:

a program code portion for comparing said program data to be transmitted with program data on a cache, said cache storing a pair of contents of said program data and contents of communication data corresponding thereto for every type of the program data;

a program code portion for, when the contents of said program data to be transmitted and the contents of the program data on said cache are matched, comparing subsequent program data to be transmitted with said program data on said cache until a difference is detected;

a program code portion for copying the communication data on said cache corresponding to the program data which is matched until said difference is detected into request communication data;

a program code portion for, when a difference is detected between contents of certain program data to be transmitted and contents of the program data on the cache, forming corresponding communication data from the program data in which said difference is detected in accordance with a type of the program data in which said difference is detected;

a program code portion for storing a correspondence between the program data in which said difference is detected and said formed communication data onto said cache; and a program code portion for, when there is no transmission program data to be compared, copying the formed communication data remaining on said cache into said request communication data.

14. A product according to claim 13, wherein said program code portion for forming the corresponding communication data from said program data in which the difference is detected further has:

a program code portion for discriminating whether the type of said program data in which the difference is detected is a basic type or a user definition type; and a program code portion for, when the type of said program data in which the difference is detected is said basic type, recognizing an architecture or an identifier of said program data in which the difference is detected and converting into the communication data.

15. A product according to claim 13, wherein said program code portion for forming the corresponding communication data from said program data in which the difference is detected further has:

a program code portion for discriminating whether the type of said program data in which the difference is detected is a basic type or a user definition type; and a program code portion for, when the type of said program data in which the difference is detected is said user definition type, recursively calling said marshalling process by using said program data in which the difference is detected as a parameter.

16. A computer software product including a computer-readable medium having a computer readable program embodied in said medium for making received request communication data subject to an unmarshalling process to generate output program data, said medium having stored thereon:

a program code portion for comparing said received request communication data with communication data on a cache in units of a predetermined communication data length, said cache storing a pair of contents of said received request communication data and contents of the communication data corresponding thereto for every type of the received request communication data;

a program code portion for, when the contents of said received request communication data and the contents of the communication data on said cache are identical, comparing subsequent received request communication data with said communication data on said cache until a difference is detected;

a program code portion for copying the communication data on said cache corresponding to the received request communication data which is matched until said difference is detected into said output program data;

a program code portion for, when a difference is detected between contents of certain received request communication data and contents of the communication data on the cache, forming corresponding program data from said received request communication data in which said difference is detected in accordance with a type of said received request communication data;

a program code portion for storing a correspondence between said received request communication data in which said difference is detected and said formed corresponding program data onto said cache; and a program code portion for, when there is no received request communication data to be compared, copying the formed corresponding program data remaining on said cache into said output program data.

17. A product according to claim 16, wherein said program code portion for forming the corresponding output program data in accordance with the type of said received request communication data in which the difference is detected further has:

a program code portion for discriminating whether the type of said received request communication data in which the difference is detected is a basic type or a user definition type; and a program code portion for, when the type of said received request communication data in which the difference is detected is said basic type, converting said data into the output program data by discriminating attributes of said received request communication data in which the difference was detected.

18. A product according to claim 10, wherein said program code portion for forming the corresponding output program data in accordance with the type of said received request communication data in which the difference is detected further has:

a program code portion for discriminating whether the type of said received request communication data in which the difference is detected is a basic type or a user definition type; and a program code portion for, when the type of said received request communication data in which the difference is detected is said user definition type, recursively calling said unmarshalling process to said received requesting communication data in which the difference is detected.

* * * * *